US007898571B1

United States Patent
Peterson

(10) Patent No.: US 7,898,571 B1
(45) Date of Patent: Mar. 1, 2011

(54) VERSATILE VIDEO DATA ACQUISITION AND ANALYSIS SYSTEM

(75) Inventor: Larry W. Peterson, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 09/512,966

(22) Filed: Feb. 25, 2000

Related U.S. Application Data

(60) Provisional application No. 60/122,489, filed on Feb. 27, 1999.

(51) Int. Cl.
*H04N 5/225* (2006.01)
*H04N 17/00* (2006.01)
*H04N 5/228* (2006.01)

(52) U.S. Cl. .............. 348/207.99; 348/207.1; 348/187; 348/222.1

(58) Field of Classification Search ........... 348/207.1, 348/207.11, 222.1, 231.1, 552, 207.99, 231.3, 348/211.4, 180, 187, 188
See application file for complete search history.

(56) References Cited

U.S. PATENT DOCUMENTS

| | | | | |
|---|---|---|---|---|
| 5,040,068 A * | 8/1991 | Parulski et al. | ............ | 348/376 |
| 5,282,268 A * | 1/1994 | Mieras et al. | ............ | 345/540 |
| 5,402,170 A * | 3/1995 | Parulski et al. | ............ | 348/211.6 |
| 5,471,055 A * | 11/1995 | Costanzo et al. | .......... | 250/252.1 |
| 5,493,332 A * | 2/1996 | Dalton et al. | ............ | 348/207.99 |
| 5,654,751 A * | 8/1997 | Richard, III | ............ | 348/192 |
| 5,699,440 A * | 12/1997 | Carmeli | ............ | 348/180 |
| 5,748,230 A * | 5/1998 | Orlando et al. | ............ | 348/187 |
| 5,760,829 A * | 6/1998 | Sussmeier | ............ | 348/187 |
| 5,883,830 A * | 3/1999 | Hirt et al. | ............ | 365/185.03 |
| 5,886,353 A * | 3/1999 | Spivey et al. | ............ | 250/370.09 |
| 6,005,613 A * | 12/1999 | Endsley et al. | ............ | 348/231.6 |
| 6,046,769 A * | 4/2000 | Ikeda et al. | ............ | 348/222.1 |
| 6,199,032 B1 * | 3/2001 | Anderson | ............ | 703/21 |
| 6,381,357 B1 * | 4/2002 | Tan et al. | ............ | 348/246 |
| 6,449,426 B1 * | 9/2002 | Suga et al. | ............ | 386/117 |
| 6,476,867 B1 * | 11/2002 | Kobayashi et al. | ............ | 348/307 |
| 6,496,361 B2 * | 12/2002 | Kim et al. | ............ | 361/683 |
| 6,583,809 B1 * | 6/2003 | Fujiwara | ............ | 348/14.12 |
| 6,587,539 B2 * | 7/2003 | Oikawa | ............ | 378/19 |
| 6,590,612 B1 * | 7/2003 | Rosenqvist et al. | ............ | 348/349 |

\* cited by examiner

*Primary Examiner* — Nhan T Tran

(57) ABSTRACT

An adaptable system (10) for automatically characterizing a sensor array (12) in software in response to commands from a user. The system (10) includes a first mechanism (12, 16, 18, 20) for acquiring and analyzing image data from the sensor array (12). A second mechanism (90, 114, 124) connected to the first mechanism (12, 16, 18, 20) obtains parameters specific to the sensor array (12). A third mechanism (114, 118, 120) automatically adjusts the first mechanism (12, 16, 18, 20) in accordance with the parameters to efficiently accommodate image acquisition and analysis by the first mechanism (12, 16, 18, 20) from the specific sensor array (12).

9 Claims, 3 Drawing Sheets

VERSATILE VIDEO DATA ACQUISITION AND ANALYSIS SYSTEM

CROSS REFERENCE TO PRIOR APPLICATION

This application claims the benefit of the filing date of a Provisional Application filed Feb. 27, 1999, Ser. No. 60/122,489 by Larry W. Peterson for Digital Video Data Acquisition and Analysis System.

BACKGROUND OF THE INVENTION

1. Field of Invention

This invention relates to electro-optical imaging systems. Specifically, the present invention relates to systems and methods for capturing and analyzing digital video data from a sensor array.

2. Description of the Related Art

Electro-optical energy sensors are employed in various applications including commercial digital cameras, industrial thermal imaging cameras, infrared night-vision systems, and missile guidance systems. Such applications often demand high-quality sensors with predetermined performance characteristics. Accordingly, special sensor-testing equipment is required to verify sensor characteristics before use in a given application. Newly manufactured sensor arrays are often discarded or employed in less demanding applications if their characteristics do not match certain criteria.

Sensor arrays are typically two-dimensional arrays of electromagnetic energy detectors. Examples include Charge-coupled Devices (CCD's), commonly employed in digital cameras and Focal Plane Arrays (FPA's), commonly employed in infrared and microwave applications.

Sensor array applications often require accurate and uniform arrays of sensors.

To verify sensor array quality, the sensor arrays are tested for bad pixels, nonuniformities, and other defects and performance characteristics via special testing equipment.

Sensor arrays with different size, type, and performance characteristics are often required for different applications. Equipment employed to test sensor arrays is typically redesigned for each application in accordance with the differing application specifications. Redesign of the testing equipment may require costly new hardware, such as video capture subsystems and other digital image acquisition and analysis circuits suited to output application-specific sensor array characteristics.

Furthermore, conventional image acquisition and analysis systems employed to characterize sensor arrays typically lack flexibility and adaptability (and lack extensibility interfaces); as they are hard-wired for particular applications. Furthermore, these application-specific systems often have significant data acquisition limitations, such as the amount of image data that can be stored and analyzed, which may undesirably limit the accuracy of the testing equipment.

Conventional systems include the PC-DAS and the ASRAAM VAP systems. The PC-DAS is a PC-based system for capturing and analyzing infrared (IR) FPA video. The system has very limited capacity and accuracy and can only capture 64 frames output from a 128×128 FPA. The system lacks mechanisms for saving all original data. Furthermore, the system is application-specific, only working with 128×128 or 256×256 FPA's.

The ASRAAM VAP is PC-based system for capturing and analyzing IR FPA video. Unfortunately, this system is also application-specific, supporting only 128×128 FPA's. Video analysis algorithms are hosted on the video capture subsystem, making the system non-portable. Stand-alone operation of the system requires software modification. The system also has limited storage capacity and can only capture 480 frames output from a 128×128 FPA. Both the ASRAAM VAP system and the PC-DAS are controlled by 16-bit DOS applications with 640 kilobyte memory limitations and both lack extensibility interfaces.

Thus, certain sensor array sizes and characteristics, such as numbers of dead pixels and nonuniformity characteristics, are required for some sensor-testing applications and not required for others. Accordingly, any special requirements are typically met by custom designing and building image acquisition and analysis systems for analyzing sensor array characteristics. System redesign is particularly costly for companies that develop sensor arrays for multiple applications.

Hence, a need exists in the art for a versatile, flexible system for acquiring an image or video from a sensor array and analyzing the acquired image. There is a further need for a video acquisition and analysis system that may be inexpensively optimized for a particular application without requiring costly redesign of the same.

SUMMARY OF THE INVENTION

The need in the art is addressed by the adaptable system for characterizing a sensor array of the present invention. In the illustrative embodiment, the inventive system is adapted for use with a focal plane array of detectors and includes a first mechanism for acquiring and analyzing image data from the sensor array. A second mechanism, in communication with the first mechanism, obtains parameters specific to the sensor array. A third mechanism automatically adjusts the first mechanism in accordance with the parameters to efficiently accommodate image acquisition and analysis by the first mechanism from the specific sensor array.

In a specific embodiment, the image data is video data, and the first mechanism includes a computer system running special video acquisition and analysis software. The video acquisition and analysis software includes an exposed automation interface. The computer system is connected to a backplane connector that connects one or more image data storage devices via one or more buses. The first mechanism further includes a frame grabber that is connected to the computer system via a bus. A universal video interface in communication with the frame grabber facilitates video synchronization when data output from the specific sensor array requires reformatting.

In a more specific embodiment, the second mechanism includes a camera parameter file for storing the parameters, which include sensor array size and type parameters. The first mechanism further includes a mechanism for acquiring the image data and a mechanism for analyzing the image data. The mechanism for acquiring the image data includes a universal video interface (UVI) and a frame grabber. The UVI includes a mechanism for automatically formatting image and/or video data from the sensor array to match an image/video format employed by the frame grabber. The mechanism for analyzing image data includes image/video analysis software running via a processor not located on the frame grabber. The image/video analysis software includes a software class having configuration parameters that are automatically set by the image/video analysis software' in accordance with the camera parameter file.

The novel design of the present invention is facilitated by the third mechanism and the camera parameter file, which allow for use of different sensor array sizes and types without requiring costly re-design of the entire system. Furthermore, the video analysis algorithms are hosted on a separate computer rather than on the video capture subsystem hardware. This enables easy replacement and/or upgrade of the video capture subsystem without requiring an overall system re-design. In addition, advancements in computer technology result in corresponding improvements in system software performance without requiring costly re-design and re-development of the entire system.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
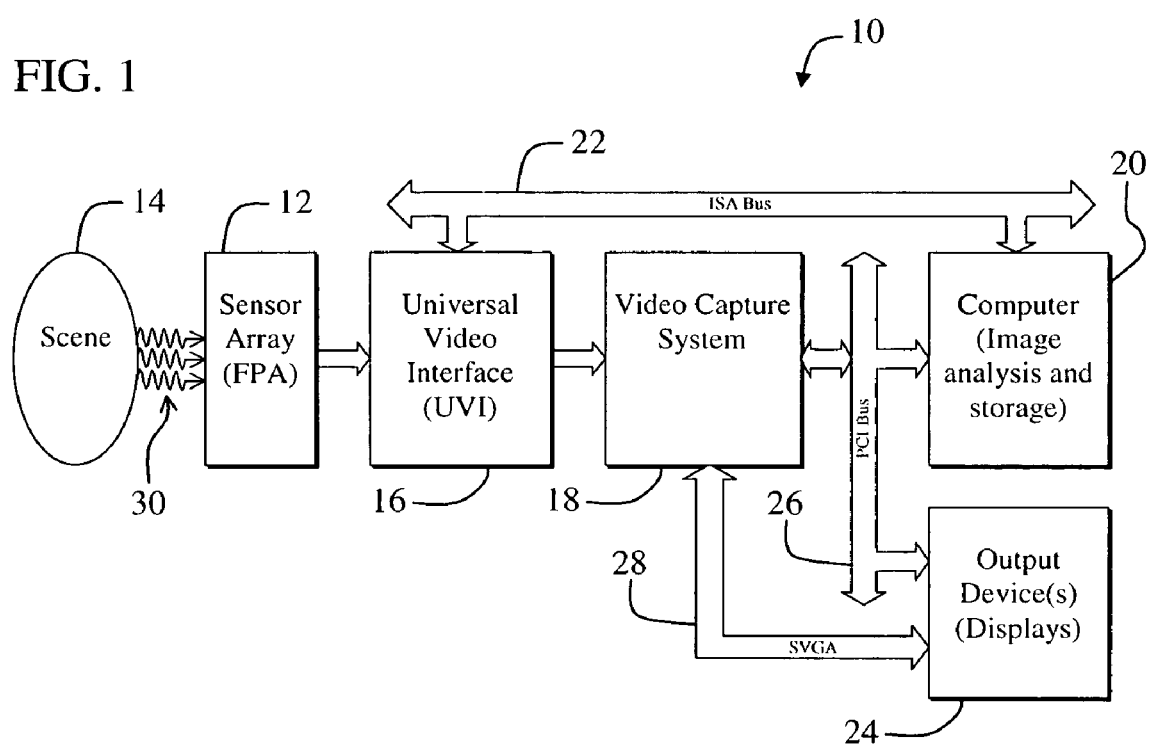
FIG. 1 is a diagram of a system for characterizing a sensor array constructed in accordance with the teachings of the present invention.

FIG. 1 is a diagram of a system 10 for characterizing a sensor array 12 constructed in accordance with the teachings of the present invention. For clarity, various components are not shown in FIG. 1, such as video storage devices and power supplies, but those skilled in the art will know where and how to implement the additional requisite components.

The sensor array 12 is an array of electromagnetic energy detectors, such as a Focal Plane Array (FPA) or a Charge-Coupled Device (CCD). The sensor array 12 is in view of a scene 14 and is in communication with a Universal Video Interface (UVI) 16. The UVI 16 is connected to a video capture system 18. An ISA bus 22 connects the UVI to a computer 20. A PCI Bus 26 connects the computer 20 to the video capture system 18 and output devices 24. The video capture system 18 is also directly connected to the output devices 24 via an SVGA connection 28. The PCI bus 26 and the ISA bus 22 are implemented via a common backplane, as discussed more fully below. Use of the backplane facilitates the addition of optional add-on modules, such as non-uniformity correction modules, and enhances the overall scalability of the system 10.

In operation, the sensor array 12 is imaged onto a scene 14, which may be predetermined laboratory setting, such as a black body source, an infrared flood source, and so on. The scene 14 is selected in accordance with the type of the sensor array 12 and its intended application. For example, to test the performance of the sensor array 12 for infrared imaging applications, the scene 14 may be specially selected infrared source.

The sensor array 12 receives electromagnetic energy 30 from the scene 14 and converts the received energy 30 into electronic video signals. The electronic video signals, which are in a predetermined video format, are then provided to the UVI 16. The UVI 16 prepares the received electronic video signals for acquisition via the video capture system 18. The signal preparation includes converting the format of the electronic video signals received from the sensor array 12 into a format compatible with the video capture system 18. The novel use of the UVI 16 to make the output of the sensor array 12 compatible with the video capture system 18 improves the adaptability of the video acquisition and analysis system 10 to different types of sensor arrays and different video capture systems.

The video capture system 18 receives specially formatted video signals from the UVI 16. In response to control signals received from software running on the computer 20, the video capture system 18 selectively stores the video in Random Access Memory (RAM) (as discussed more fully below), outputs corresponding video directly to the output devices 24, and/or outputs the corresponding video to image/video analysis software and or data storage devices included with the computer 20.

Those skilled in the art will appreciate that video data is sequenced image data. The video acquisition and analysis system 10 may be employed to analyze individual images or video without departing from the scope of the present invention.

The computer 20 runs special video analysis software, as discussed more fully below, that includes a special automation interface and a camera parameter file. The automation interface facilitates remote control of the system 10 via the software running on the computer 20. The camera parameter file allows for automatic adjustment of constituent image analysis algorithms in accordance with certain parameters of the sensor array. In the present embodiment, these parameters include sensor array size and type. The size of the sensor array 12 is particularly important, since image analysis algorithms running on the computer 20 often operate on predetermined Regions Of Interests (ROI's), which must be appropriately scaled for sensor arrays of different sizes. The size of a sensor array is often specified by the horizontal and vertical pixel dimensions (i.e., the number of horizontal and vertical detectors, respectively), and the shape of the sensor array (e.g., circular, rectangular, or square).

By strategically separating various image/video analysis functions from the video capture system 18 and implementing these functions on the computer 20, the adaptability and versatility of the system 10 is greatly enhanced. Pre-existing systems often implement the image/video analysis functionality in hardware and/or software running on the video capture system 18. This is disadvantageous and inhibits the implementation of newer faster algorithms. In addition, attainment of improvements in processing speed may require replacing the video capture system 18, which is often an expensive custom module. Furthermore, the image storage capability of many conventional video acquisition and analysis systems is limited by the amount of memory onboard the video capture system 18. This limited image/video storage capacity is problematic when very accurate video analysis is desired. The accuracy of video analysis algorithms employed to measure characteristics of the sensor array 12 is often proportional to the amount of image data that may be stored and evaluated by the associated system.

In the present system 10, additional or different software functionality may be easily and relatively inexpensively installed on the computer 20. In addition, image/video storage capability is easily increased via the addition of storage devices, such as RAID drives, as discussed more fully below.

The system 10 is a general-purpose digital data acquisition and analysis system. The system 10 is particularly useful for characterizing infrared FPA sensors and seekers. The system 10 may be employed in various development and production programs and generally lacks program-specific features. The system 10 may be built with Commercial Off-The-Shelf (COTS) hardware and Raytheon software. The hardware 16, 18, 20, 24 is configured to provide maximum flexibility and applicability to various applications. The software, as discussed more fully below, includes various algorithms for computing important figures of merit, such as temporal noise and uniformity measurements and dead cell identification, related to sensors and seekers.

The system 10 is designed for extensibility and includes features, such as a software automation interface and a network adapter, that allow client/server operation over a network, as discussed more fully below. The computer 20 includes various data storage devices for expanding the data storage capacity of the system 10 by orders of magnitude over existing systems. The UVI 16 allows video capture from several different formats. Software running on the computer 20 accommodates file input/output for various file types.

Figure 2:
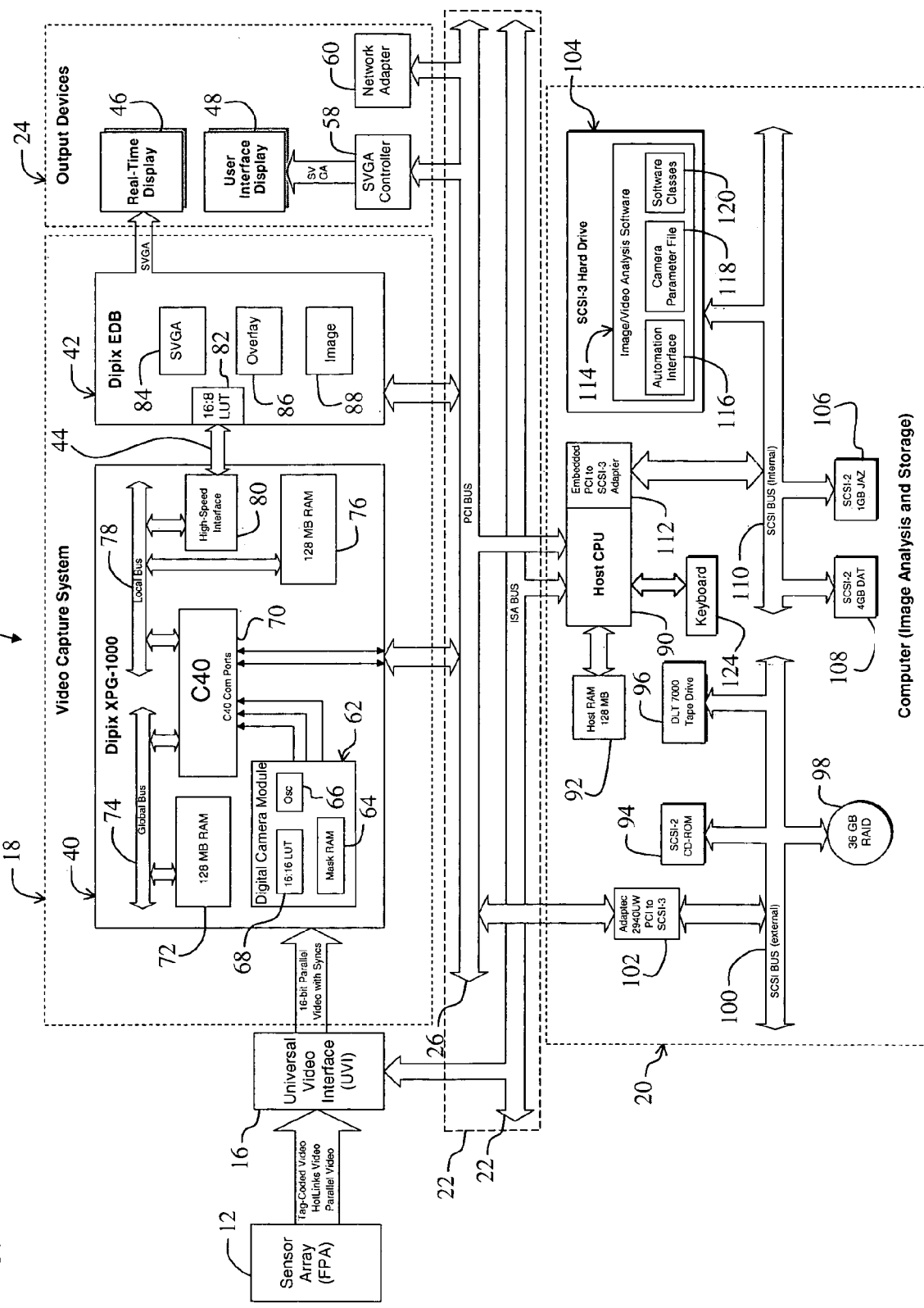
FIG. 2 is a more detailed diagram of the system of FIG. 1.

FIG. 2 is a more detailed diagram of the system 10 of FIG. 1. For clarity, various components are omitted from FIG. 2, such as computer mice and other input devices, however one skilled in the art will know where and how to implement additional requisite components with access to the present invention.

In the present specific embodiment, the video capture system 18 includes a Dipix® XPG-1000 frame grabber board 40 that is connected to the UVI 16 and includes a Dipix® EDB video board 42. The frame grabber 40 and the video board 42 are connected to the computer system 20 via the PCI bus 26, which is also connected to the output devices 24. The frame grabber 40 is connected to the video board 42 via a high-peed connection 44 and the PCI bus 26. The video board 42 is also directly connected to a real-time display 46 included in the output devices 24. The output devices 24 also include a network adapter 60 connected to the PCI bus 26 and a separate user-interface display 48 that is connected to the PCI bus 26 via an SVGA controller 58.

The frame grabber board 40 includes a digital camera module 62 with mask RAM 64, a synchronization oscillator 66, and a first Look-up Table (LUT) 68. The digital camera module 62 is connected to a C40 Digital Signal Processor (DSP) 70. The C40 DSP 70 is also connected to global RAM 72 via a global bus 74, local RAM 76 via a local bus 78, and is connected to a high-speed interface 80 via the local bus 78. The high-speed interface 80 is connected to a second LUT 82 in the Dipix® EDB video board 42. The video board 42 also includes an SVGA module 84, an overlay module 86, and an image module 88.

The particular video capture system 18 employed in the present specific embodiment may be ordered from Dipix. Those skilled in the art will appreciate that other types of video capture systems may be employed in the system 10 instead of the Dipix-based system 18 without departing from the scope of the present invention.

The computer system 20 includes a host Central Processing Unit (CPU) 90 in communication with the UVI 16 via the ISA bus 22. Host. RAM 92 is connected to the host CPU 90. The host CPU 90 is connected to the video capture system 18 and to the output devices 24 via the PCI bus 26. The computer system 20 also includes a SCSI-2 CD-ROM drive 94, a DLT 7000 tape drive 96, and a RAID drive 98, that are connected to an external SCSI bus 100. The SCSI bus 100 is connected to the PCI bus 26 via an Adaptec 2940UW PCI-to-SCSI-3 adapter 102. The video storage devices 94, 96, and 98 may be internal or external to the computer system 20 without departing from the scope of the present invention.

The computer system 20 also includes a SCSI-3 hard drive 104, a SCSI-2 JAZ drive 106, and a SCSI-2 DAT drive 108 that are connected to an internal SCSI bus 110. The internal SCSI bus 110 is connected to the host CPU 90 via an embedded PCI-to-SCSI-3 adapter 112. The SCSI-3 hard drive 104 stores image/video analysis software 114 that includes an exposed automation interface 116, a camera parameter file 118, and special software classes 120.

In operation, a user inputs size and type parameters associated with the sensor array 12 into the computer 20 via a keyboard 124 in communication with the host CPU 90. The parameters are stored in the camera parameter file 118, which then populates software classes 120 of the image/video analysis software 114 with the updated parameters. In the present embodiment, the camera parameter file 118 is in a Dipix® camera parameter file format.

The software classes 120 are accessed by video analysis functions associated with the image/video analysis software 114. Hence, each, analysis function that depends on sensor array size accesses the new parameters via the classes 120 and the camera parameter file 118 for analysis and calculation purposes. This greatly enhances the versatility of the system 10 and its ability to easily accommodate sensor arrays of different sizes and types and obviates the need to re-design the entire system 10 for each project employing a different type of sensor array, as is conventionally done.

The automation interface 116 facilitates remote control of the image/video analysis software 114 via an executive controller (not shown) connected to the system 110 via a network and the network adapter 60. This is particularly useful in production environments. Use of the automation interface 116 extends the applicability of the system 10 to not only engineering and development environments, but also production environments.

After appropriate parameters of the sensor array 12 are entered in the camera parameter file 18, the system 10 is activated, and the image/video analysis software 114 runs on the computer 20 via the host CPU 90 and host RAM 92.

The sensor array 12 outputs electronic signals representative of a scene to the UVI 16. The outputted electronic signals may be in various formats, such as tag-coded video, hotlinks video, or parallel video. The UVI 16 formats the received video signals in accordance with a format readable by the frame grabber 40. In the present embodiment, the UVI 16 outputs 16-bit parallel video with synchronization to the frame grabber 40. The frame grabber 40 selectively grabs frames of video output from the UVI 16 and stores the frames in global RAM 72 and the local RAM 76. The grabbed frames are selectively provided to the computer system 20 and stored on various storage devices, such as the RAID drive 98, the tape drive 96, the DAT drive 108, and the JAZ drive 106. The stored images are processed and analyzed via the image/video analysis software 114 and the host CPU 90. The results of the analysis are displayable on the user-interface display 48, and may be stored on any of the data storage devices 98, 94, 96, 106, 108, 104 of the computer system 20.

If the image/video analysis software 114 enables real-time display via control to signals sent to the video capture system 18, real-time video data is delivered from the global RAM 72 and the local RAM 76 on the frame grabber board 40 to the video board 42 via the high-speed interface 80 and corresponding high-speed connection 44. The video board 42 may be commanded to implement various overlay and imaging functions via the image/video analysis software 114 prior to display of the video via the real-time display 46. Use of the two displays 46 and 48, for real-time video display and user-interface display, respectively, greatly facilitates video analysis and increases the amount of simultaneously displayable video information.

The UVI 16 may be ordered from Raytheon. Those skilled in the art will appreciate that the UVI 16 may be omitted for some applications without departing from the scope of the present invention. In addition, those skilled in the art will appreciate that the various off-the-shelf modules employed in the system 10 of the present invention may be upgraded with newer or different devices as they, become available, without departing from the scope of the present invention.

The computer 20, the associated busses 100 and 110, and the data storage devices 94, 96, 98, 106, 108, 104 increase the amount of data that can be collected/analyzed by an order of magnitude over any previous similar system, which greatly increases in the accuracy of the video acquisition and analysis system 10. The busses 100 and 110 facilitate the addition of new data storage devices and/or the replacement of existing devices without costly redesign of the video acquisition and analysis system 10. Sensor arrays of different sizes may be analyzed by the system 10 without requiring software or hardware modification. All software algorithms and capture functions of the image/video analysis software 114 running on the computer 20 automatically adjust to given sensor array size and data width up to 16 bits.

The system 10 is significantly faster than any previous similar system. The software 114 and associated algorithms are executed on the computer 20, which hosts the system 10 rather than on the video capture subsystem 18. Consequently, increases execution speed are realized with each new generation of computer processor. In the present specific embodiment, the software 114 is a 32-bit application running on Windows NT®, which is, a pre-emptive, multitasking operating system.

The hosting of the algorithms on the computer 20 rather than the video capture subsystem 18 also allows operation of the system 10 without a video capture subsystem when the data to be analyzed pre-exists on the computer 20 or is imported via tape, Jaz disk, a network, or other device or system, resulting in a corresponding cost reduction.

The image/video analysis software 114 may be ordered from Raytheon. In the present embodiment, the computer 20 is rack-mounted industrial PC that employs a passive backplane 126 design and the single board processor 90. The single board processor 90 is typically at least a Pentium 200 MHz with 128 Mbytes of RAM. The passive backplane 26 includes both the ISA bus 22 and the PCI bus 26. The SCSI-3 to PCI host adapter card 112 is installed to provide interfacing for various peripheral devices (hard-drive, tape backup, Jaz® drive) and for extensibility. The frame grabber board 40 is manufactured by Dipix Technologies of Canada (which was recently purchased by Coreco). The frame grabber board 40 interfaces to the PCI bus 26 and typically contains at least 256 Mbytes of RAM for frame buffering. The UVI 16 may be also ordered from Raytheon. The UVI 16 interfaces to the ISA bus 22 and provides video synchronization for the frame grabber 40 when the video source is not in the correct format for the frame grabber 40. The UVI 16 also provides real-time non-uniformity correction and intermediate buffering of the video data from the sensor array 12.

The image/video analysis software 114 implements various additional functions including multi-document user interface functionality and Dynamic Data Exchange (DDE) and Object Linking and Embedding (OLE) with various programs, such as Microsoft Excel®, Microsoft Word®, Mathcad®, etc.

Figure 3:
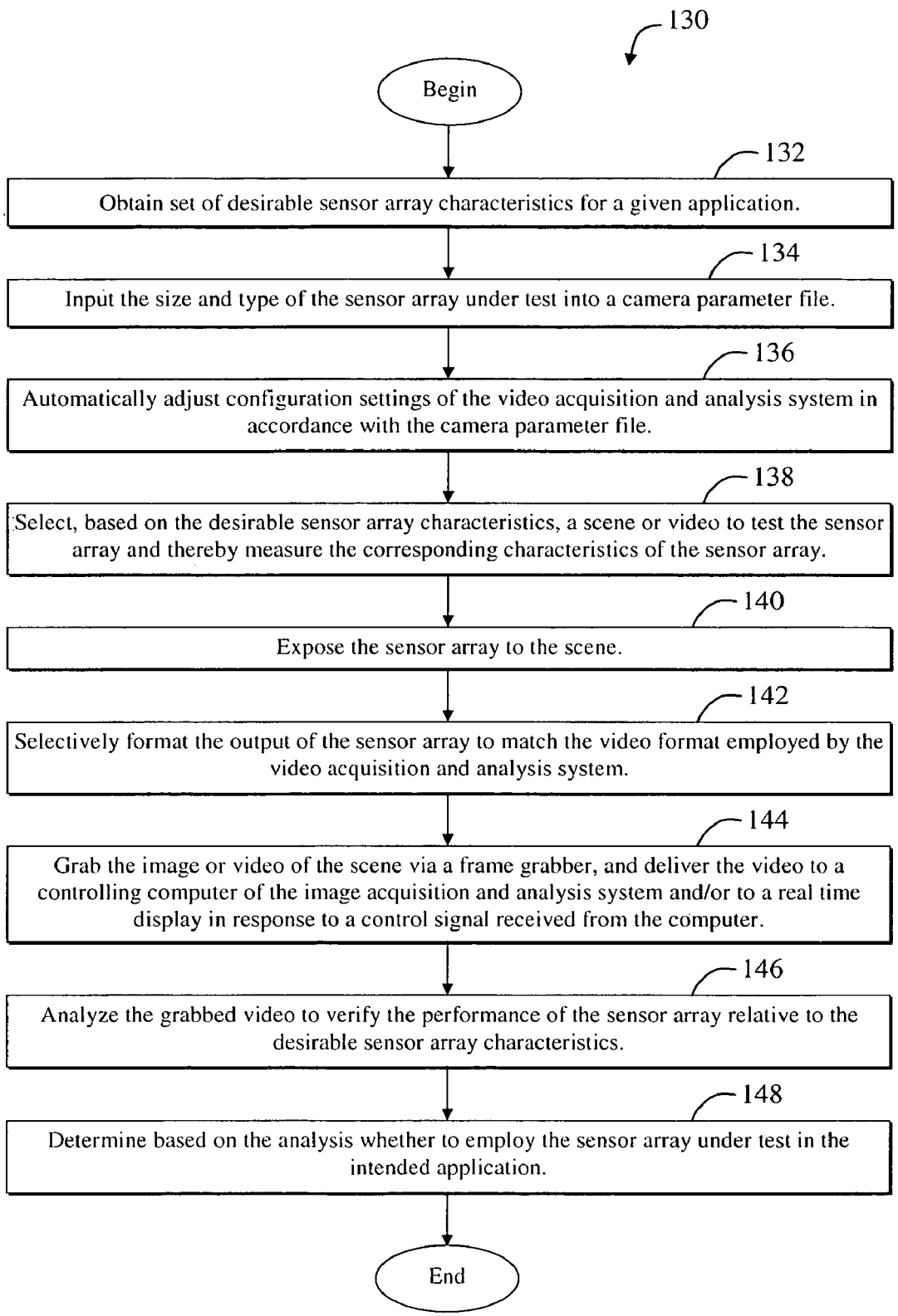
FIG. 3 is an exemplary flow diagram of a method employed by the image acquisition and analysis system of FIG. 2 to characterize a sensor array.

FIG. 3 is an exemplary flow diagram of a method 130 according to the present invention for characterizing sensor array 12 via the video acquisition and analysis system 10 of FIG. 2. With reference to FIGS. 2 and 3, in an initial step 132, sensor array characteristics for which the sensor array 12 will be evaluated are determined in accordance with the requirements of a given application.

Subsequently, in a parameter step 134, sensor array parameters, such as size and type, are input to the computer system 20 and stored in the camera parameter file 118 that is accessible by the software classes 120. Those skilled in the art will appreciate that the software classes 120 may be omitted, or replaced with another type of software data structure without departing from the scope of the present invention.

After the parameters of the sensor array 12 are input to the camera parameter file 118, control is passed to an adjusting step 136. In the adjusting step 136, the image/video analysis software 114 automatically adjusts configuration settings of the video acquisition and analysis system 10 in accordance with the parameter file 118. All requisite hardware settings are programmed by the software 114 via programmable registers (not shown) in the hardware.

Subsequently, control is passed to a scene-selection step 138, where a scene designed for testing the sensor characteristics selected in the initial step 132 is selected. Control is then passed to an imaging step 140, where the sensor array 12 is exposed to the selected scene (see 14 of FIG. 1). The sensor array 12 then outputs video signals representative of the scene.

The video signals output from the sensor array 12 are formatted to match the video format employed by the video acquisition and analysis system 18 via the UVI 16 in a formatting step 142. Control is then passed to a frame-grabbing step 144. In the frame-grabbing step 144, the frame grabber 40 acquires the video output from the UVI 16 and selectively delivers the acquired image(s) to the video board 42 and the real-time display 46 and/or to the computer system 20 in response to control signals received from the computer system 20.

In a subsequent video analysis step 146 the image/video analysis software 114 running on the computer 20 analyzes the acquired video received from the video capture system 18. The acquired video and resulting analysis indicates the performance characteristics of the sensor array 12, which are then compared to the desirable sensor array characteristics determined in the initial step 132.

Subsequently, in a quality-determination step 148, the sensor array 12 is passed or failed depending on the results of the video analysis step 146. If the tested characteristics of the sensor array 12 are marginal relative to the desirable characteristics, then the sensor array 12 is not employed for the originally intended application.

Thus, the present invention has been described herein with reference to a particular embodiment for a particular application. Those having ordinary skill in the art and access to the present teachings will recognize additional modifications, applications, and embodiments within the scope thereof.

It is therefore intended by the appended claims to cover any and all such applications, modifications and embodiments within the scope of the present invention.

Accordingly,

What is claimed is:

1. An infrared focal plane array analysis system comprising:
    a universal video interface adapted to be coupled to and operative with first or second infrared focal plane arrays, said first and second focal plane arrays being adapted to output electronic video data in first and second formats respectively, said first and second formats being unique in vertical dimension, horizontal dimension or shave, and said universal video interface being adapted to convert said data in said first format to a third format or a fourth format and to convert said second format to said third format or said fourth format, said third format being unique in vertical dimension, horizontal dimension or shape relative to said first and fourth formats and said fourth, format being unique in vertical dimension, horizontal dimension or shape relative to said second and third formats;

a first video capture system coupled to said video interface, said video capture system being compatible with electronic video signals in accordance with said third format or said fourth format;

a computer coupled to said video capture system; and software stored on a machine readable medium adapted to be executed by said computer analyze and store image data output by said video capture system in response to user input.

2. The invention of claim 1 further including an output device.

3. The invention of claim 2 wherein said output device is a display.

4. The invention of claim 1 wherein said universal video interface is adapted to receive data from said array and output said data to said first video capture system in a format compatible with said first video capture system.

5. The invention of claim 4 wherein said universal video interface is adapted to receive tag coded video, hotlinks video and/or parallel video and output parallel video.

6. The invention of claim 1 wherein said first video capture system includes a frame grabber.

7. The invention of claim 6 wherein said first video capture system includes a video board adapted to receive data from said frame grabber.

8. The invention of claim 7 further including a display coupled to said video board.

9. The invention of claim 8 further including a bus coupled between said computer, said video interface, said frame grabber, said video board and said display.

\* \* \* \* \*